(12) United States Patent
Hosomi et al.

(10) Patent No.: US 10,807,177 B2
(45) Date of Patent: Oct. 20, 2020

(54) METHOD FOR MIG BRAZING, METHOD FOR MANUFACTURING LAP JOINT MEMBER, AND LAP JOINT MEMBER

(71) Applicant: NIPPON STEEL NISSHIN CO., LTD., Tokyo (JP)

(72) Inventors: Kazuaki Hosomi, Tokyo (JP); Kouki Tomimura, Tokyo (JP); Takefumi Nakako, Tokyo (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 0 days.

(21) Appl. No.: 16/487,523

(22) PCT Filed: Feb. 21, 2018

(86) PCT No.: PCT/JP2018/006288
§ 371 (c)(1),
(2) Date: Aug. 21, 2019

(87) PCT Pub. No.: WO2018/155508
PCT Pub. Date: Aug. 30, 2018

(65) Prior Publication Data
US 2020/0055133 A1 Feb. 20, 2020

(30) Foreign Application Priority Data

Feb. 22, 2017 (JP) .................................. 2017-031610
Oct. 3, 2017 (JP) .................................. 2017-193612

(51) Int. Cl.
*B23K 1/19* (2006.01)
*B23K 1/20* (2006.01)
(Continued)

(52) U.S. Cl.
CPC .................. *B23K 1/19* (2013.01); *B23K 1/20* (2013.01); *B23K 35/282* (2013.01); *C22C 18/04* (2013.01);
(Continued)

(58) Field of Classification Search
CPC .......... B23K 1/19; B23K 1/20; B23K 35/282; B23K 2103/15; B23K 2103/10; B23K 2101/18
(Continued)

(56) References Cited

U.S. PATENT DOCUMENTS 7,521,129 B2  4/2009  Takeda et al.
7,850,059 B2  12/2010  Kobayashi et al.
(Continued)

FOREIGN PATENT DOCUMENTS

CN  1767922 A    5/2006
CN  101043968 A  9/2007
(Continued)

OTHER PUBLICATIONS

International Preliminary Report on Patentability and Written Opinion for PCT/JP2018/006288, English translations, 7 pages.
(Continued)

*Primary Examiner* — Phuong T Nguyen
(74) *Attorney, Agent, or Firm* — Mintz Levin Cohn Ferris Glovsky and Popeo, P.C.; David G. Conlin; Joohee Lee

(57) ABSTRACT

The present invention provides a method for MIG brazing an Al alloy to a steel sheet so as to manufacture a lap joint member that excels in bonding strength with respect to the Al alloy. With the MIG brazing method, a bonding target sheet, specifically, an Al sheet or an Al alloy sheet is bonded to a hot dip Zn-based alloy coated steel sheet (1) whose coating layer contains Al in an amount of 1.0% by mass to 22.0% by mass. A target location of MIG brazing is a region
(Continued)

between (i) an intersection (C) of one end of an end surface (6) of the bonding target sheet and the hot dip Zn-based alloy coated steel sheet and (ii) the other end (U) of the end surface of the bonding target sheet.

7 Claims, 2 Drawing Sheets

(51) Int. Cl.
　　　*B23K 35/28*　　(2006.01)
　　　*C22C 18/04*　　(2006.01)
　　　*B23K 103/08*　 (2006.01)
　　　*B23K 103/10*　 (2006.01)
　　　*B23K 101/18*　 (2006.01)

(52) U.S. Cl.
　　　CPC ...... *B23K 2101/18* (2018.08); *B23K 2103/10* (2018.08); *B23K 2103/15* (2018.08)

(58) Field of Classification Search
　　　USPC .................. 219/121.46, 121.64, 129, 74, 75
　　　See application file for complete search history.

(56) References Cited

U.S. PATENT DOCUMENTS

| | | |
|---|---|---|
| 9,174,298 B2 | 11/2015 | Kasukawa et al. |
| 10,421,148 B2 | 9/2019 | Sigler et al. |
| 2004/0035910 A1 | 2/2004 | Dockus et al. |
| 2005/0258218 A1 | 11/2005 | Schmaranzer et al. |
| 2006/0150387 A1 | 7/2006 | Kobayashi et al. |
| 2006/0272749 A1 | 12/2006 | Spriestersbach et al. |
| 2009/0001141 A1 | 1/2009 | Spriestersbach et al. |
| 2009/0011269 A1 | 1/2009 | Urushihara et al. |
| 2009/0017328 A1 | 1/2009 | Katoh et al. |
| 2009/0050608 A1 | 2/2009 | Hayashi et al. |
| 2012/0021240 A1 | 1/2012 | Urushihara et al. |
| 2015/0136741 A1 | 5/2015 | Hosomi et al. |
| 2015/0174702 A1 | 6/2015 | Fujimoto et al. |
| 2015/0337428 A1* | 11/2015 | Ooi ..................... C23C 2/06 428/659 |
| 2017/0197269 A1 | 7/2017 | Matsumoto et al. |
| 2017/0274479 A1 | 9/2017 | Katoh et al. |
| 2017/0297137 A1 | 10/2017 | Perry et al. |
| 2017/0326672 A1 | 11/2017 | Nobutoki et al. |
| 2018/0036840 A1 | 2/2018 | Hu et al. |
| 2018/0071852 A1 | 3/2018 | Nobutoki et al. |
| 2019/0061053 A1 | 2/2019 | Yang et al. |
| 2019/0151983 A1 | 5/2019 | Li et al. |

FOREIGN PATENT DOCUMENTS

| | | | |
|---|---|---|---|
| CN | 101405105 A | 4/2009 | |
| CN | 101941119 A | 1/2011 | |
| CN | 104334308 A | 2/2015 | |
| EP | 1806200 A1 | 7/2007 | |
| EP | 1980357 A1 | 10/2008 | |
| JP | 2006-283110 A | 10/2006 | |
| JP | 2006-283111 A | 10/2006 | |
| JP | 2006283111 * | 10/2006 | ............ C22C 38/00 |
| JP | 2007-247024 A | 9/2007 | |
| JP | 2007-277717 A | 10/2007 | |
| JP | 2008-68290 A | 3/2008 | |
| JP | 2009-056492 A | 3/2009 | |
| JP | 2011-218424 A | 11/2011 | |
| JP | 2011218424 * | 11/2011 | ............... B23K 1/00 |
| JP | 2012-125821 A | 7/2012 | |
| JP | 2012-152789 A | 8/2012 | |
| JP | 2012152789 * | 8/2012 | ............... B23K 1/19 |
| JP | 5198528 B2 | 5/2013 | |
| JP | 5494158 B2 | 5/2014 | |
| WO | 2016/084423 A1 | 6/2016 | |

OTHER PUBLICATIONS

International Search Report for PCT/JP2018/006288, dated May 1, 2018, English translation, 1 page.
Chinese Office Action for Chinese Patent Application No. 201880013190.7, dated Mar. 10, 2020, Chinese language, 6 pages.
Chinese Office Action for Chinese Patent Application No. 201880013190.7, dated Mar. 10, 2020, English language, 7 pages.
Extended European Search Report for European Patent Application No. 18756918.1, dated Feb. 21, 2020, 8 pages.
Basak, S. et al., "Characterization of intermetallics in aluminum to zinc coated interstitial free steel joining by pulsed MIG brazing for automotive application", Materials Characterization, vol. 112 (Dec. 29, 2015) 229-237.
Sasabe, S. et al., "Study on the factors in creating the IMC-free region: dissimilar metal joining of aluminium alloys to steel by a MIG-braze welding by using the advanced hot-dip aluminized steel sheet", Welding International, (Apr. 1, 2014) vol. 28, Nos. 4-6, 273-280.
Office Action for U.S. Appl. No. 16/487,516 dated Jan. 30, 2020, 11 pages.
Office Action for U.S. Appl. No. 16/487,523, dated Feb. 24, 2020, 9 pages.
Office Action for U.S. Appl. No. 16/487,523, dated Apr. 14, 2020, 30 pages.
Chinese Office Action for Chinese Patent Application No. 2018800132149, dated Feb. 21, 2020, English translation, 7 pages.
Chinese Office Action for Chinese Patent Application No. 2018800132149, dated Feb. 21, 2020, Chinese language, 7 pages.
Extended European Search Report for European Patent Application No. 18757929, dated Nov. 22, 2019, 8 pages.
International Search Report for PCT/JP2018/006219, dated May 29, 2018, 1 page.
International Preliminary Report of Patentability and Written Opinion for International Application No. PCT/JP2018/006219, 4 pages.

* cited by examiner

METHOD FOR MIG BRAZING, METHOD FOR MANUFACTURING LAP JOINT MEMBER, AND LAP JOINT MEMBER

CROSS-REFERENCES TO RELATED APPLICATIONS

This application is a U.S. national phase application, pursuant to 35 U.S.C. § 371, of PCT/JP2018/006288, filed Feb. 21, 2018, which claims priority to Japanese Application No. 2017-031610, filed Feb. 22, 2017 and Japanese Application No. 2017-193612, filed Oct. 3, 2017. The entire contents of the aforementioned patent applications are incorporated herein by this reference.

TECHNICAL FIELD

The present invention relates to (i) a method for MIG brazing Al or an Al alloy to a hot dip Zn-based alloy coated steel sheet, (ii) a method for manufacturing a lap joint member with the MIG brazing method, and (iii) a lap joint member.

BACKGROUND ART

In order to reduce a weight of an automobile body, an amount of used Al and Al alloy (hereinafter, Al and an Al alloy are collectively referred to as "Al alloy") is increasing. However, in a case where an Al alloy is bonded to a steel sheet with a conventional melt welding process such as an arc welding process, there is a problem that a fragile Fe—Al-based intermetallic compound phase grows thicker in an interface between the steel sheet and a weld bead, and therefore bonding strength decreases.

As a method for inhibiting growth of the Fe—Al-based intermetallic compound phase, for example, Patent Literatures 1 through 4 disclose steel sheets for brazing in which concentrations of C, Si, and Mn in steel of an alloyed hot dip Zn coated steel sheet, a hot dip Zn coated steel sheet, and a Zn electroplated steel sheet are specified. The steel sheet for brazing diffuses, from the steel, C, Si, and Mn into the Fe—Al-based intermetallic compound phase in brazing, and thus inhibits growth of the fragile Fe—Al-based intermetallic compound phase, and heightens the bonding strength.

Si and Mn are useful in heightening strength of steel sheets, and are used in high-tensile steel sheets. However, in a hot dip Zn coated steel sheet, Si and Mn are incrassated into oxides on a steel sheet surface in reduction heating before plating. This inhibits wettability between a steel sheet and a plating bath, and causes a plating defect. In an alloyed hot dip Zn coated steel sheet, Si and Mn inhibit diffusion that occurs between a steel sheet and a coating layer in an alloying process after plating, and thus causes a delay in alloying reaction.

In brazing also, Si and Mn in steel are incrassated on the steel sheet surface in brazing, and inhibit wettability between a brazing filler metal and an Al alloy. As a result, repelling between the brazing filler metal and the Al alloy, pits, and blowholes are generated, and this causes deterioration in bead appearance, detachment of bead, and decrease in bonding strength. Therefore, amounts of Si and Mn to be added to steel are limited. Moreover, strength of the steel sheet increases due to the addition of Si and Mn in steel as above, and therefore a type of steel to which such steel is applicable is limited to high-tensile steel, and such steel cannot be used in a general steel sheet.

CITATION LIST

Patent Literature

[Patent Literature 1]
Japanese Patent Application Publication Tokukai No. 2006-283110 (Publication date: Oct. 19, 2006)
[Patent Literature 2]
Japanese Patent Application Publication Tokukai No. 2006-283111 (Publication date: Oct. 19, 2006)
[Patent Literature 3]
Japanese Patent Application Publication Tokukai No. 2007-247024 (Publication date: Sep. 27, 2007)
[Patent Literature 4]
Japanese Patent Application Publication Tokukai No. 2007-277717 (Publication date: Oct. 25, 2007)
[Patent Literature 5]
Japanese Patent Application Publication Tokukai No. 2008-68290 (Publication date: Mar. 27, 2008)
[Patent Literature 6]
Japanese Patent Application Publication Tokukai No. 2011-218424 (Publication date: Nov. 4, 2011)

SUMMARY OF INVENTION

Technical Problem

An object of the present invention is to provide (i) a lap joint member that excels in bead appearance and in bonding strength by using, in brazing an Al alloy to a steel sheet, a hot dip Zn-based alloy coated steel sheet in which Al is added to a coating layer and (ii) a method for manufacturing such a lap joint member.

Solution to Problem

As a result of diligent study by the inventors of the present invention, the inventors have newly found that a hot dip Zn-based alloy coated steel sheet in which a coating layer contains Al excels in affinity with a brazing filler metal and an Al alloy and, in a case where the Al alloy is brazed, it is possible to achieve good bead appearance and high bonding strength. Based on this novel finding, the inventors have accomplished the present invention.

That is, an MIG brazing method in accordance with an aspect of the present invention is a method for MIG brazing a bonding target sheet that is stacked on a sheet surface of a hot dip Zn-based alloy coated steel sheet, a coating layer of the hot dip Zn-based alloy coated steel sheet containing 1.0% by mass to 22.0% by mass of Al, and the bonding target sheet being an Al sheet or an Al alloy sheet, the method including: a brazing step of forming a brazed part on the sheet surface for joining the bonding target sheet and the hot dip Zn-based alloy coated steel sheet together, in the brazing step, a target location of the MIG brazing being a region between (i) an intersection of one end of an end surface of the bonding target sheet and the sheet surface and (ii) the other end of the end surface of the bonding target sheet.

A lap joint member in accordance with an aspect of the present invention is a lap joint member, in which: a brazed part is formed by stacking and brazing a bonding target sheet onto a sheet surface of a hot dip Zn-based alloy coated steel sheet; a coating layer of the hot dip Zn-based alloy coated steel sheet contains 1.0% by mass to 22.0% by mass of Al; the bonding target sheet is an Al sheet or an Al alloy sheet; and the brazed part is formed such that, in a cross section of the brazed part taken along a plane orthogonal to a direction in which the brazed part extends, a bead width of the brazed part on the sheet surface satisfies Formula (1) below:

$$t \leq W \leq 7.5t \quad (1)$$

where
W: bead width (mm) of brazed part
t: sheet thickness (mm) of the bonding target sheet.

Advantageous Effects of Invention

According to an aspect of the present invention, it is possible to provide the MIG brazing method for manufacturing a lap joint member which is provided between the Al alloy and the steel sheet and excels in bead appearance and in bonding strength.

BRIEF DESCRIPTION OF DRAWINGS

FIG. 2(a) indicates a target location at a lower end, and FIG. 2(b) indicates a target location at an upper end.

DETAILED DESCRIPTION

Figure 1:
FIG. 1 is a schematic view illustrating a cross section of a lap joint member in an embodiment of the present invention.

The following description will discuss embodiments of the present invention. Note that the following descriptions are aimed merely at better understanding of the gist of the invention, and do not limit the present invention unless otherwise specified. In the present application, "A to B" means A or more (higher) and B or less (lower).

Embodiment 1

Before now, various measures have been proposed for inhibiting growth of an Fe—Al-based intermetallic compound phase in brazing. However, there are cases where the growth inhibiting effect is insufficient, and a type of steel of a coated steel sheet to which such a measure is applicable is limited. Under the circumstances, the inventors of the present invention carried out the diligent study and, as a result, the following new conception has been obtained. That is, a hot dip Zn-based alloy coated steel sheet in which a Zn-based coating layer contains Al excels in affinity with a brazing filler metal and an Al alloy. This broadens a bead width W (later described), and it is therefore possible to increase a shear plane area of a bead. From this, the inventors of the present invention have found that it is possible to prevent a decrease in bonding strength (shear strength) of the brazed part even in a case where the Fe—Al-based intermetallic compound phase has grown thicker. Based on this new finding, the inventors of the present invention have accomplished the present invention. The following description will discuss details of an embodiment of the present invention.

[Hot Dip Zn-Based Alloy Coated Steel Sheet]

According to a hot dip Zn-based alloy coated steel sheet for brazing in accordance with an embodiment of the present invention, a coating layer contains Zn as a main component, and contains Al in an amount of not less than 1.0% by mass and not more than 22.0% by mass. In general, in brazing of an Al alloy, a brazing filler metal is used which contains Al or Zn as a main component. According to the hot dip Zn-based alloy coated steel sheet for brazing in accordance with an embodiment of the present invention, the coating layer contains (i) an Al alloy and (ii) Zn and Al which are main components of a brazing filler metal. Therefore, the hot dip Zn-based alloy coated steel sheet in accordance with Embodiment 1 excels in affinity with the Al alloy and the brazing filler metal. Further, wettability is improved and it is therefore possible to achieve good bead appearance. Furthermore, the bead width is broadened, and this enhances the bonding strength.

This effect is obtained when the Al concentration is not less than 1% by mass, and therefore the Al concentration is limited to not less than 1% by mass.

In contrast, in a case where the Al concentration exceeds 22% by mass, a melting point of the Zn-based coating layer becomes higher and the affinity is deteriorated. In this case, the wettability is deteriorated, and a humping bead with irregular bead widths occurs, that is, the bead appearance is deteriorated. Moreover, the bead width is narrowed, and the bonding strength is deteriorated.

In a case where 0.05% by mass to 10.0% by mass of Mg is added to the Zn-based coating layer, a melting point of the Zn-based coating layer becomes lower. Further, the affinity with the Al alloy and the brazing filler metal improves, and this leads to excellent bonding strength. Moreover, the addition of Mg also leads to excellent corrosion resistance. Therefore, it is preferable to add 0.05% by mass to 10.0% by mass of Mg to the Zn-based coating layer. In a case where Mg is added, the coating layer preferably contains Ti: 0.002% by mass to 0.1% by mass or B: 0.001% by mass to 0.05% by mass in order to inhibit generation and growth of a $Zn_{11}Mg_2$ system phase which causes deterioration in coating layer appearance and in corrosion resistance.

Further, the Zn-based coating layer can contain Si in an amount of not more than 2.0% by mass in order to inhibit growth of the Fe—Al-based intermetallic compound phase in brazing and accordingly to heighten the bonding strength. Moreover, the Zn-based coating layer can contain Fe in an amount of not more than 2.5% by mass.

The above feature can be expressed as follows. That is, the coating layer of the hot dip Zn-based alloy coated steel sheet for brazing in accordance with an embodiment of the present invention preferably contains Zn as a main component, contains 1% by mass to 22% by mass of Al and 0.05% by mass to 10.0% by mass of Mg, and further satisfies one or more conditions selected from the group consisting of Ti: 0.002% by mass to 0.1% by mass, B: 0.001% by mass to 0.05% by mass, Si: 0% by mass to 2.0% by mass, and Fe: 0% by mass to 2.5% by mass.

[Coating Weight]

According to the hot dip Zn-based alloy coated steel sheet for brazing in accordance with an embodiment of the present invention, it is more effective to set a coating weight per surface to 15 $g/m^2$ or more in order to achieve good wettability with respect to the Al alloy and the brazing filler metal. The coating weight per surface can also be expressed as a coating weight on the sheet surface of the hot dip Zn-based alloy coated steel sheet on which sheet surface the brazed part is formed. A low coating weight is disadvantageous for maintaining corrosion resistance and sacrificial anti-corrosive effect of a coated surface over a long period of time. Therefore, the coating weight is set to 15 $g/m^2$ or more.

In contrast, in a case where the coating weight per surface exceeds 250 g/m², a generation amount of Zn vapor in brazing becomes greater, and this leads to generation of a humping bead, pits, and blowholes, and accordingly leads to deterioration in bead appearance and in bonding strength. Therefore, the coating weight is preferably 250 g/m² or less.

[Al Alloy]

According to an embodiment of the present invention, an Al alloy is not limited in particular. It is possible to use a 5000-series Al alloy or a 6000-series Al alloy which is mainly used in an automobile body, and the other Al alloy can also be used. For example, it is possible to use a 1000-series Al alloy, a 3000-series Al alloy, or a 7000-series Al alloy. Note that, as described earlier, the term "Al alloy" used in this specification encompasses pure Al (that may contain impurities).

In this specification, unless otherwise noted, the Al alloy has a shape of sheet, and accordingly the Al alloy means an Al alloy sheet. Further, according to an embodiment of the present invention, the Al sheet or the Al alloy sheet is to be subjected to MIG brazing, and therefore can be expressed as a bonding target sheet.

[Bead Width]

FIG. 1 is a schematic view illustrating a cross section of a lap joint member in which the hot dip Zn-based alloy coated steel sheet for brazing in accordance with an embodiment of the present invention is brazed to an Al alloy. A lap joint is a joint that is often used in brazing an Al alloy to a steel sheet for an automobile body.

As illustrated in FIG. 1, in the lap joint member in accordance with an embodiment of the present invention, an Al alloy 3 is stacked on a hot dip Zn-based alloy coated steel sheet 1, and a bead 4 is formed by brazing. The bead can be expressed as a brazed part (brazed joint part) that is formed by brazing.

A sheet thickness of the Al alloy 3 that is used in the automobile body is selected as appropriate in accordance with demanded strength. Therefore, in the present invention, a bead width W is also controlled within a range of Formula (1) below in accordance with the sheet thickness of the Al alloy 3. That is, in a case where the sheet thickness is increased so as to enhance strength of the Al alloy 3, the bead width W is also broadened to enhance bonding strength.

$$t \leq W \leq 7.5t \quad (1)$$

where

W: bead width (mm) of brazed part t: sheet thickness (mm) of Al alloy

For example, in a case where the sheet thickness of the Al alloy 3 is 2 mm, bonding strength adequate for the automobile body is 4 kN or more. In a case where the bead width W satisfies Formula (1) above, it is possible to achieve excellent bonding strength even if an Fe—Al-based intermetallic compound phase 5 grows. However, in a case where the bead width W is smaller than a sheet thickness t of the Al alloy 3, the bonding strength decreases. In contrast, in a case where the bead width W exceeds 7.5 t, it is necessary to increase a heat input for broadening the bead width, and consequently an evaporation region of a Zn-based coating layer 2 around a bead part becomes larger, and therefore corrosion resistance decreases.

[Brazing Method]

The lap joint member in accordance with an embodiment of the present invention is brazed with use of an MIG brazing method. The following description will discuss the MIG brazing method in accordance with an embodiment of the present invention, with reference to FIG. 2 and FIG. 4.

Figure 2:
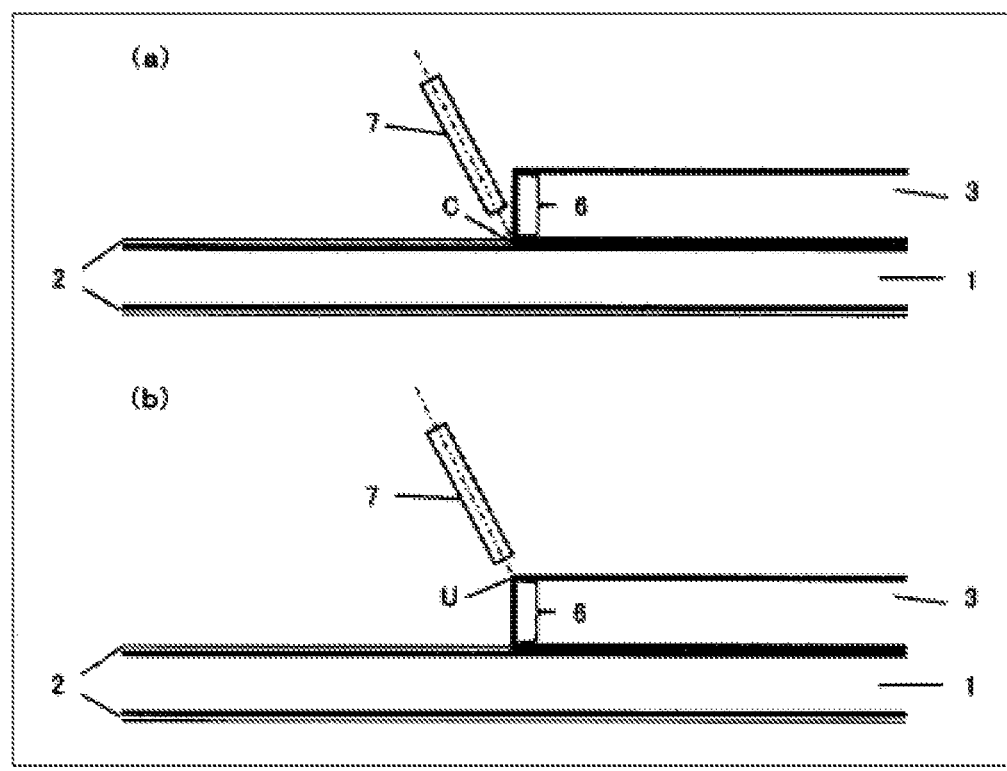
FIG. 2 is a schematic view illustrating a target location of MIG brazing in an embodiment of the present invention.
Figure 4:
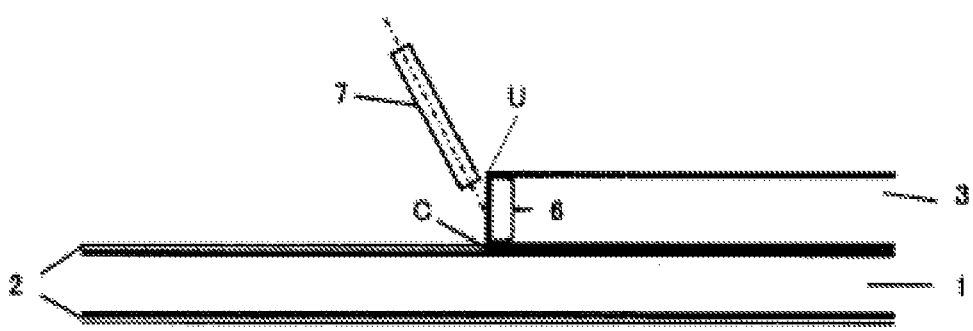
FIG. 4 is a schematic view illustrating a target location of MIG brazing in an embodiment of the present invention.

FIG. 2 is a schematic view illustrating the MIG brazing method in accordance with an embodiment of the present invention. FIG. 2(a) indicates a target location at a lower end, and FIG. 2(b) indicates a target location at an upper end. FIG. 4 is a schematic view illustrating a target location of MIG brazing in an embodiment of the present invention. The Al alloy (Al alloy sheet) 3 is stacked on the hot dip Zn-based alloy coated steel sheet 1. In an aspect of the present invention, a target location of a brazing filler metal wire 7 is a region between (i) an intersection C (see FIG. 2(a)) between an end surface 6 of the Al alloy 3 and the hot dip Zn-based alloy coated steel sheet 1 and (ii) an upper end U (see FIG. 2(b)) of the end surface 6 of the Al alloy 3, that is, the target location is the end surface 6 of the Al alloy 3 as illustrated in FIG. 4.

In this case, the bead width W can be broadened, and can be controlled to fall within the above defined range.

Figure 3:
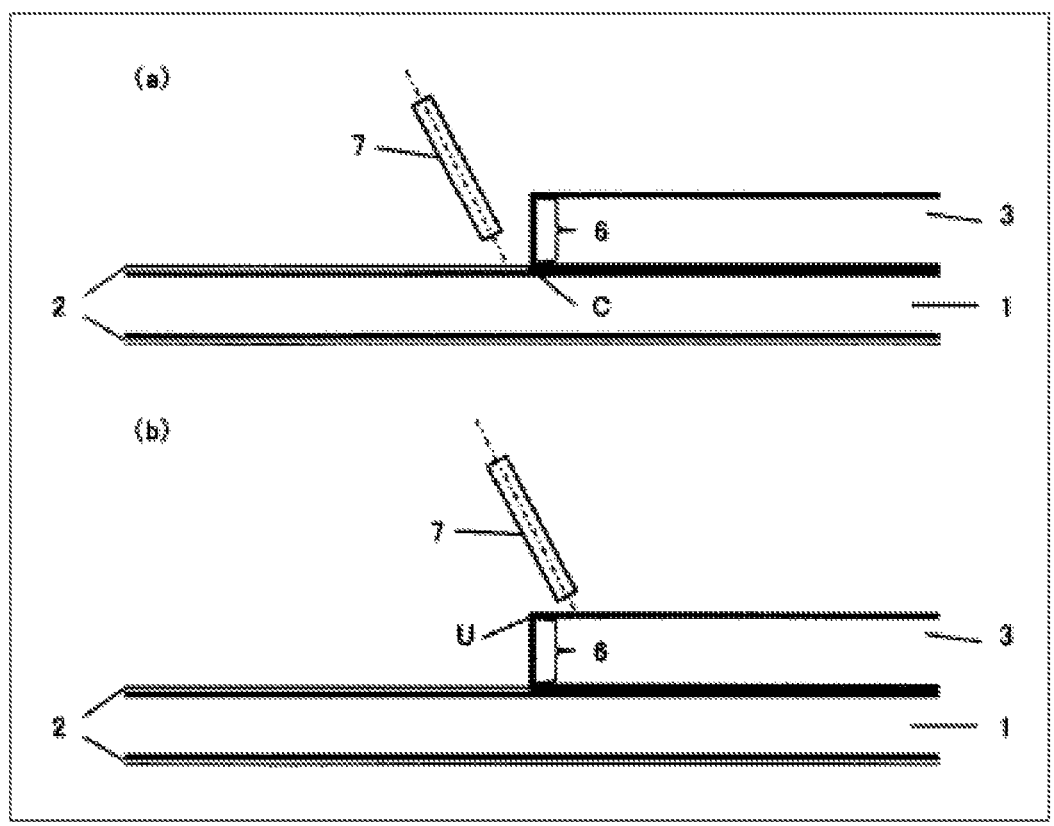
FIG. 3 is a schematic view illustrating a target location of MIG brazing in a case other than the present invention.

In contrast, in a case where a target location of the brazing filler metal wire 7 is apart from the end surface 6 of the Al alloy 3 and is on the hot dip Zn-based alloy coated steel sheet 1 as illustrated in FIG. 3(a), the Al alloy 3 is melted insufficiently and the bead width W becomes smaller. Moreover, an arc is widened more than necessary, and this causes an increase in evaporation region on the Zn-based coating layer 2, and consequently corrosion resistance decreases. Furthermore, in a case where an amount of Zn vapor increases, the arc becomes unstable, and humping is notably generated. Moreover, the Zn vapor remains in the bead, and blowholes are notably generated.

In a case where the target location is apart from the upper end of the Al alloy 3 and is on the upper surface of the Al alloy 3 as illustrated in FIG. 3(b), the Al alloy 3 is melted insufficiently, humping is notably generated, and the bead width W becomes smaller.

In the MIG brazing method in accordance with an embodiment of the present invention, it is possible to use a general-purpose MIG welding machine. Such equipment is inexpensive, and therefore the present MIG brazing method can be suitably used in view of cost. According to the present invention, a power source is not particularly limited. It is possible to employ any of a direct current system, an alternating current system, and a pulsed system.

[Brazing Filler Metal]

In Embodiment 1, the brazing filler metal is not particularly limited. It is possible to employ a typical Al-based brazing filler metal or Zn-based brazing filler metal for Al alloy. Moreover, in order to inhibit growth of the Fe—Al-based intermetallic compound phase, Si can be added to the brazing filler metal. Alternatively, it is possible to use a flux brazing filler metal which contains flux for improving wettability.

(Advantageous Effect)

As such, according to the MIG brazing method in accordance with an aspect of the present invention, it is possible to manufacture the lap joint member that excels in bead appearance and in bonding strength.

In general, a steel sheet may be bonded to an Al alloy by spot welding. As compared with such spot welding, the MIG brazing method in accordance with Embodiment 1 has the following advantages. That is, unlike the spot welding in which the steel sheet needs to be melted, it is sufficient to supply heat merely for melting the Zn-based coating layer 2 and the brazing filler metal wire 7 in the present MIG brazing method, and it is not necessary to melt a base steel sheet of the hot dip Zn-based alloy coated steel sheet 1.

Depending on a quantity of supplied heat, the end surface 6 of the Al alloy 3 is also melted slightly. That is, according to the present MIG brazing method, a quantity of heat used for bonding is smaller as compared with the spot welding. Therefore, it is possible to reduce heat distortion that would occur in the lap joint member. From this, for example, it is possible to reduce a problem such as warpage that may occur in the spot welding.

Further, by the present MIG brazing method, it is possible to successively bond the hot dip Zn-based alloy coated steel sheet to the Al alloy. Therefore, the lap joint member that has been manufactured by the present MIG brazing method excels in sealing property. For example, in the field of automobiles, a gap is filled with a sealer after spot welding. In a case where the present MIG brazing method is employed, it is unnecessary to carry out such a process of using a sealer.

Further, according to the present MIG brazing method, it is possible to make the Fe—Al-based intermetallic compound phase thinner which is formed in the joint part, and it is also possible to improve bonding strength of the lap joint member by the foregoing successive bonding.

Example 1-1

The present invention will be described below in detail with reference to Examples and Comparative Examples. Note, however, that the present invention is not limited to such Examples.

A hot dip Zn-based alloy coated steel sheet having a sheet thickness of 1.2 mm, a width of 200 mm, and a length of 100 mm, and a 6000-series Al alloy member having a sheet thickness of 2.0 mm, a width of 200 mm, and a length of 100 mm were prepared. Then, MIG brazing was carried out with respect to the Al alloy member that was stacked on the hot dip Zn-based alloy coated steel sheet with a positional displacement of 50 mm in a length direction, and thus a lap joint sample was prepared. Table 1 shows MIG brazing conditions.

TABLE 1

| Power source | Direct current system |
| --- | --- |
| Electric current | 50 to 100 A |
| Voltage | 10 to 30 V |
| Brazing filler metal | Al-1.0% by mass of Si, Fluoride-based flux wire, 1.2 mmφ |
| Target location | End surface of Al alloy (Example) On hot dip Zn-based alloy coated steel sheet (Comparative Example) On Al alloy (Comparative Example) |
| Shielding gas | Ar gas, flow rate: 20 L/min |
| Brazing rate | 0.5 to 1.0 m/min |

The lap joint sample thus prepared was visually observed, and the presence or absence of humping and pits was checked. After the visual observation, X-ray radiography was carried out to check the presence or absence of blowholes. After the X-ray radiography, a sample for tensile test having a width of 30 mm was taken out from a central part of the lap joint sample, and a tensile test was carried out at a tensile speed of 3 mm/min. In the present invention, bonding strength is defined by a maximum load in the tensile test. Bonding strength adequate for the automobile body is 4 kN or more. A sample for observing a cross section was taken out from a part very near to the part from which the sample for tensile test was taken out, and cross section observation was carried out with use of a microscope to check a bead width W.

The investigation results are shown in Table 2. In regard to the bead appearance in Table 2, a successive bead appearance without humping and pits was evaluated as good, and a case in which humping or pits were generated was evaluated as bad.

In Examples in which MIG brazing was carried out within the range of the present invention indicated by No. 1 through No. 13 in Table 2, humping and pits were not generated, and good bead appearances were obtained. Moreover, the bonding strength was 4 kN or more, and thus the bonding strength sufficient for an automobile body was obtained.

In contrast, in Comparative Example No. 14 in which an Al concentration of the Zn-based coating layer was smaller than the range of the present invention, the bead width W was smaller, i.e., 0.7 mm, and the bonding strength was insufficient, i.e., 2.0 kN.

In Comparative Example No. 15 in which the coating weight exceeded the range of the present invention and in Comparative Example No. 16 in which the target location was 2 mm away from the end surface of the Al alloy 3 and was on the hot dip Zn-based alloy coated steel sheet, humping and pits were generated due to influence of Zn vapor, and therefore the bead appearance was notably deteriorated, and blowholes were generated. In Comparative Examples No. 15 and No. 16, the bead appearance was notably deteriorated, and therefore the tensile test was not carried out.

In Comparative Example No. 17 in which the target location is 3 mm away from the upper end of the Al alloy 3 and is on the Al alloy 3, humping was generated and the bead appearance was notably deteriorated. Therefore, X-ray radiography and the tensile test were not carried out.

In Comparative Examples No. 18 through No. 20, the bead appearance was bad because humping or pits were generated, and the bead width W was smaller than the range of the present invention. Further, the bonding strength was insufficient, i.e., 3.3 kN or less.

TABLE 2

| No. | Coating layer composition (% by mass) | | | | | | Coating weight per surface (g/m²) | Target location | Bead appearance | Blow-hole | Bead width W (mm) | Tensile test result (kN) | Class |
| | Al | Mg | Ti | B | Si | Fe | | | | | | | |
| --- | --- | --- | --- | --- | --- | --- | --- | --- | --- | --- | --- | --- | --- |
| 1 | 1.1 | — | — | — | — | — | 15 | End surface of Al alloy | Good | None | 2.9 | 4.8 | Example |
| 2 | 4.0 | — | — | — | — | — | 45 | End surface of Al alloy | Good | None | 10.2 | 5.5 | |
| 3 | 21.7 | — | — | — | — | — | 90 | End surface of Al alloy | Good | None | 11.6 | 6.0 | |
| 4 | 1.2 | 0.07 | — | — | — | — | 120 | End surface of Al alloy | Good | None | 12.2 | 5.4 | |
| 5 | 2.1 | 2.0 | — | — | — | — | 150 | End surface of Al alloy | Good | None | 13.0 | 6.7 | |

TABLE 2-continued

| | Coating layer composition (% by mass) | | | | | | Coating weight per surface | | Bead | Blow- | Bead width | Tensile test result | |
|---|---|---|---|---|---|---|---|---|---|---|---|---|---|
| No. | Al | Mg | Ti | B | Si | Fe | (g/m²) | Target location | appearance | hole | W (mm) | (kN) | Class |
| 6 | 4.1 | 1.0 | — | — | — | — | 180 | End surface of Al alloy | Good | None | 14.7 | 8.0 | |
| 7 | 21.8 | 9.7 | — | — | — | — | 220 | End surface of Al alloy | Good | None | 2.1 | 4.2 | |
| 8 | 6.1 | 3.0 | — | — | — | — | 245 | End surface of Al alloy | Good | None | 8.8 | 5.4 | |
| 9 | 5.9 | 3.1 | 0.035 | — | — | — | 90 | End surface of Al alloy | Good | None | 13.7 | 6.5 | |
| 10 | 6.0 | 3.0 | 0.034 | 0.02 | 0.056 | 0.02 | 90 | End surface of Al alloy | Good | None | 14.1 | 7.7 | |
| 11 | 11.1 | 3.2 | — | — | — | — | 90 | End surface of Al alloy | Good | None | 12.0 | 5.2 | |
| 12 | 11.0 | 3.0 | — | — | 0.054 | 0.01 | 90 | End surface of Al alloy | Good | None | 6.9 | 5.7 | |
| 13 | 21.8 | 5.9 | 0.1 | 0.05 | 2.0 | 2.5 | 90 | End surface of Al alloy | Good | None | 3.4 | 4.9 | |
| 14 | 0.2 | — | — | — | — | — | 15 | End surface of Al alloy | Good | None | 0.7 | 2.0 | Com. Example |
| 15 | 1.1 | — | — | — | — | — | 276 | End surface of Al alloy | Bad | Exist | — | — | |
| 16 | 22.0 | — | — | — | — | — | 160 | On hot dip Zn-based alloy coated steel sheet 2 mm away from end surface of Al alloy | Bad | Exist | — | — | |
| 17 | 5.8 | 3.3 | 0.002 | 0.005 | — | — | 90 | On Al alloy 3 mm away from end surface of Al alloy | Bad | — | — | — | |
| 18 | 6.0 | 2.8 | 0.002 | 0.001 | — | — | 45 | On hot dip Zn-based alloy coated steel sheet 1.3 mm away from end surface of Al alloy | Bad | — | 1.7 | 3.3 | |
| 19 | 6.1 | 3.0 | 0.025 | 0.01 | 0.025 | 0.002 | 90 | On Al alloy 1.5 mm away from end surface of Al alloy | Bad | — | 1.4 | 3.1 | |
| 20 | 5.8 | 3.0 | 0.1 | 0.05 | 1.8 | 2.5 | 120 | On hot dip Zn-based alloy coated steel sheet 1.2 mm away from end surface of Al alloy | Bad | — | 1.0 | 2.9 | |

Example 1-2

MIG brazing was carried out with use of a hot dip Zn-based alloy coated steel sheet and each of Al alloys of 1000-series, 3000-series, 5000-series, 6000-series, and 7000-series. Table 3 shows compositions of those Al alloys.

TABLE 3

| Type of Al alloy | Composition (% by mass) | | | | | | | | |
|---|---|---|---|---|---|---|---|---|---|
| | Si | Fe | Cu | Mn | Mg | Cr | Zn | Ti | Al |
| 1000-series | 0.01 | 0.02 | 0.01 | 0.01 | 0.01 | — | 0.01 | 0.01 | Bal. |
| 3000-series | 0.53 | 0.21 | 0.13 | 0.88 | 0.054 | 0.01 | 0.01 | 0.01 | Bal. |
| 5000-series | 0.09 | 0.10 | 0.02 | 0.07 | 4.63 | 0.09 | 0.16 | 0.02 | Bal. |
| 6000-series | 0.66 | 0.33 | 0.26 | 0.08 | 0.96 | 0.18 | 0.01 | 0.01 | Bal. |
| 7000-series | 0.22 | 0.13 | 1.56 | 0.12 | 2.66 | 0.21 | 5.54 | 0.02 | Bal. |

Specifically, a hot dip Zn-based alloy coated steel sheet having a sheet thickness of 1.2 mm, a width of 200 mm, and a length of 100 mm, and an Al alloy member of each series having a sheet thickness of 1.0 mm to 3.0 mm, a width of 200 mm, and a length of 100 mm were prepared. Then, MIG brazing was carried out with respect to the Al alloy member that was stacked on the hot dip Zn-based alloy coated steel sheet with a positional displacement of 50 mm in a length direction, and thus a lap joint sample was prepared. MIG brazing conditions are similar to those in Table 1 above.
Table 4 shows the results.

TABLE 4

| | Coating layer composition (% by mass) | | | | | | Coating weight per surface | Type of Al | Sheet thickness (mm) of | | Bead | Blow- | Bead width | Tensile test result | |
|---|---|---|---|---|---|---|---|---|---|---|---|---|---|---|---|
| No. | Al | Mg | Ti | B | Si | Fe | (g/m²) | alloy | Al alloy | Target location | appearance | hole | W (mm) | (kN) | Class |
| 21 | 6.0 | 3.0 | 0.034 | 0.02 | 0.056 | 0.02 | 90 | 1000-series | 1.0 | End surface of Al alloy | Good | None | 2.1 | 4.2 | Example |
| 22 | | | | | | | | | 2.0 | End surface of Al alloy | Good | None | 11.7 | 9.5 | |
| 23 | | | | | | | | | 3.0 | End surface of Al alloy | Good | None | 20.9 | 11.6 | |
| 24 | | | | | | | | 3000-series | 1.0 | End surface of Al alloy | Good | None | 3.7 | 5.1 | |

TABLE 4-continued

| No. | Coating layer composition (% by mass) | | | | | | Coating weight per surface (g/m²) | Type of Al alloy | Sheet thickness (mm) of Al alloy | Target location | Bead appearance | Blow-hole | Bead width W (mm) | Tensile test result (kN) | Class |
|---|---|---|---|---|---|---|---|---|---|---|---|---|---|---|---|
| | Al | Mg | Ti | B | Si | Fe | | | | | | | | | |
| 25 | | | | | | | | | 2.0 | End surface of Al alloy | Good | None | 10.8 | 5.6 | |
| 26 | | | | | | | | | 3.0 | End surface of Al alloy | Good | None | 19.5 | 10.8 | |
| 27 | | | | | | | | 5000-series | 1.0 | End surface of Al alloy | Good | None | 1.9 | 3.0 | |
| 28 | | | | | | | | | 2.0 | End surface of Al alloy | Good | None | 2.8 | 5.0 | |
| 29 | | | | | | | | | 3.0 | End surface of Al alloy | Good | None | 18.5 | 9.1 | |
| 30 | | | | | | | | 6000-series | 1.0 | End surface of Al alloy | Good | None | 5.2 | 5.6 | |
| 31 | | | | | | | | | 2.0 | End surface of Al alloy | Good | None | 14.1 | 7.7 | |
| 32 | | | | | | | | | 3.0 | End surface of Al alloy | Good | None | 22.1 | 12.6 | |
| 33 | | | | | | | | 7000-series | 1.0 | End surface of Al alloy | Good | None | 1.3 | 3.2 | |
| 34 | | | | | | | | | 2.0 | End surface of Al alloy | Good | None | 9.3 | 7.5 | |
| 35 | | | | | | | | | 3.0 | End surface of Al alloy | Good | None | 20.1 | 11.1 | |

In Examples in which MIG brazing was carried out within the range of the present invention indicated by No. 21 through No. 35 in Table 4, humping and pits were not generated, and good bead appearances were obtained. Moreover, the bonding strength corresponded to the type and the sheet thickness of each of the Al alloys, and thus the bonding strength sufficient for an automobile body was obtained.

Embodiment 2

The following description will discuss another embodiment of the present invention. For convenience of explanation, identical reference numerals are given to constituent members having functions identical with those of the constituent members described in the foregoing embodiment, and descriptions of such constituent members are not repeated here.

Conventionally, as a method for bonding an Al alloy to a steel sheet while inhibiting growth of an Fe—Al-based intermetallic compound phase, a flux wire brazing process is employed in which an Al alloy wire containing flux that contains fluoride, chloride, or the like as a main component is used. The flux containing fluoride, chloride, or the like is used in order to activate the steel sheet surface by removing oxide on the steel sheet surface with an etching effect, and to achieve good adherence by improving wettability between (i) the steel sheet and (ii) a melted Al alloy and a melted Al alloy wire.

For example, Patent Literature 5 discloses a method for brazing an Al alloy to a hot dip Zn coated steel sheet with use of an Al alloy wire that contains Si in an amount of 1% by mass to 13% by mass and also contains flux containing $AlF_3$. According to the brazing method, good bonding strength is supposed to be obtained by (i) an activation effect by the flux on the steel sheet surface and (ii) an effect of inhibiting growth of an Fe—Al-based intermetallic compound phase by Si in the Al alloy wire and $AlF_3$ in the flux.

However, in a case where the flux wire is used, a flux residue remains in a bead part after brazing, and this deteriorates an appearance. Furthermore, the flux residue serves as a corrosion accelerating factor, and therefore corrosion resistance is notably deteriorated. Furthermore, in a case where painting is carried out after brazing, paintability and corrosion resistance after painting are also notably deteriorated. Therefore, in a case where the flux wire is used, not only a cost of wire increases but also a cost of process increases because the flux residue needs to be cleaned off.

A fluxless brazing method in which no flux is used can be, for example, a method disclosed in Patent Literature 6. Patent Literature 6 discloses an arc brazing method in which a location to be brazed is irradiated with a laser beam in advance to evaporate oxide, and sequentially brazing is carried out while using a brazing filler metal as a consumable electrode. According to the method, a laser heating device and an arc-welding device are required, and therefore a cost of equipment is high, and accordingly a cost of brazing increases.

Before now, various methods for brazing an Al alloy to a steel sheet have been proposed. However, such conventional methods have a problem that flux needs to be added to a wire and a flux residue needs to be removed, and also have a problem of increase in cost, particularly increase in cost of equipment due to using of a laser heating device in combination with an arc-welding device.

An object of Embodiment 2 is to provide a lap joint member which excels in bead appearance and in bonding strength at a low cost by carrying out fluxless MIG brazing for brazing an Al alloy to a steel sheet with use of a hot dip Zn-based alloy coated steel sheet in which a coating layer contains Al.

The inventors of the present invention carried out the diligent study and, as a result, the following new conception has been obtained. That is, the inventors have newly found that a hot dip Zn-based alloy coated steel sheet in which a Zn-based coating layer contains Al excels in wettability between a brazing filler metal and an Al alloy, and therefore it is possible to obtain a lap joint that excels in bonding strength by carrying out MIG brazing without using flux.

Based on this new finding, the inventors of the present invention have accomplished the present invention. The following description will discuss details of an embodiment of the present invention.

[Hot Dip Zn-Based Alloy Coated Steel Sheet]

According to a hot dip Zn-based alloy coated steel sheet that is used in a method for manufacturing a lap joint member of Embodiment 2 by carrying out fluxless MIG brazing on the hot dip Zn-based alloy coated steel sheet and an Al alloy member, a coating layer contains Zn as a main component, and contains Al in an amount of not less than 1.0% by mass and not more than 22.0% by mass. The coating layer of the hot dip Zn-based alloy coated steel sheet contains Al which is a main component of the Al alloy and of the brazing filler metal, and this allows the coating layer of the hot dip Zn-based alloy coated steel sheet to excel in wettability between the Al alloy and the brazing filler metal. It is therefore possible to achieve good bead appearance without using flux, and the bead width is broadened, and this enhances the bonding strength. This effect is obtained when the Al concentration is not less than 1% by mass, and therefore the Al concentration is limited to not less than 1% by mass. In contrast, in a case where the Al concentration exceeds 22% by mass, a melting point of the Zn-based coating layer becomes higher and wettability is deteriorated. Further, a humping bead with irregular bead widths occurs and accordingly the bead appearance is deteriorated. Moreover, the bead width is narrowed, and the bonding strength is deteriorated.

In a case where 0.05% by mass to 10.0% by mass of Mg is added to the hot dip Zn-based alloy coating layer, a melting point of the Zn-based coating layer becomes lower. Further, the wettability between the Al alloy and the brazing filler metal improves without using flux, and this leads to excellent bonding strength. Moreover, the addition of Mg also leads to excellent corrosion resistance. Therefore, it is preferable to add 0.05% by mass to 10.0% by mass of Mg to the hot dip Zn-based alloy coating layer. In a case where Mg is added, the coating layer can contain Ti: 0.002% by mass to 0.1% by mass or B: 0.001% by mass to 0.05% by mass in order to inhibit generation and growth of a ZniiMg2 system phase which causes deterioration in coating layer appearance and in corrosion resistance.

Further, the Zn-based coating layer can contain Si in an amount of not more than 2.0% by mass in order to inhibit growth of the fragile Fe—Al-based intermetallic compound phase in brazing and accordingly to heighten the bonding strength. Moreover, the Zn-based coating layer can contain Fe in an amount of not more than 2.5% by mass.

The above feature can be expressed as follows. That is, the coating layer of the hot dip Zn-based alloy coated steel sheet that is used in the method for manufacturing a lap joint member by fluxless MIG brazing in accordance with an aspect of the present invention contains Zn as a main component and contains Al in an amount of 1% by mass to 22% by mass. Preferably, the coating layer satisfies one or more conditions selected from the group consisting of: Mg: 0.05% by mass to 10.0% by mass, Ti: 0.002% by mass to 0.1% by mass, B: 0.001% by mass to 0.05% by mass, Si: 0% by mass to 2.0% by mass, Fe: 0% by mass to 2.5% by mass.

[Al Alloy]

The Al alloy that is used in fluxless MIG brazing of Embodiment 2 is similar to that used in Embodiment 1, and therefore the description of the Al alloy is omitted here.

[Brazing Method]

The fluxless MIG brazing method in Embodiment 2 is similar to that of Embodiment 1 but is different in the following point. That is, in Embodiment 2, a fluxless wire is used as a brazing filler metal wire 7 (see FIGS. 2 and 3). This means that the brazing filler metal used in the fluxless MIG brazing in Embodiment 2 contains no flux.

The following description will discuss the fluxless wire.

[Brazing Filler Metal]

The brazing filler metal can be composed of Al. Alternatively, the brazing filler metal can be an alloy having a composition containing one or more selected from Si: 0.2% by mass to 15.0% by mass and Mn: 0.03% by mass to 2.0% by mass, in addition to Al. An effect brought about by adding Si or Mn is to inhibit growth of an Fe—Al-based intermetallic compound phase in a bead part. Further, the brazing filler metal in accordance with an aspect of the present invention can contain Mg in an amount of 0.3% by mass to 7.0% by mass in order to lower a melting point and viscosity of the brazing filler metal and to improve wettability between (i) the brazing filler metal and (ii) the Al alloy and the hot dip Zn-based alloy coated steel sheet.

[Coating Weight, Bead Width]

A coating weight per surface of the hot dip Zn-based alloy coated steel sheet and a bead width of the lap joint member in accordance with Embodiment 2 are similar to those of Embodiment 1, and therefore the descriptions are omitted here.

(Advantageous Effect)

According to the fluxless MIG brazing method in accordance with Embodiment 2, the following effect is brought about, in addition to an effect similar to that of the MIG brazing method described in Embodiment 1.

That is, the coating layer of the hot dip Zn-based alloy coated steel sheet contains Al which is a main component of the Al alloy and of the brazing filler metal, and this allows the coating layer to excel in wettability between the Al alloy and the brazing filler metal. It is therefore possible to achieve good bead appearance without using flux, and the bead width can be broadened, and this can enhance the bonding strength.

As such, it is unnecessary to add flux to the brazing filler metal wire, and it is also unnecessary to carry out a process of removing (cleaning) a flux residue after brazing. Further, as compared with the conventional method in which a laser heating device is used in combination with an arc-welding device, a cost of equipment is lower. Therefore, it is possible to reduce a cost for brazing.

Example 2-1

The following shows Examples of Embodiment 2.

A hot dip Zn-based alloy coated steel sheet having a sheet thickness of 1.2 mm, a width of 200 mm, and a length of 100 mm, and a 6000-series Al alloy member having a sheet thickness of 2.0 mm, a width of 200 mm, and a length of 100 mm were prepared. Then, fluxless MIG brazing was carried out with respect to the Al alloy member that was stacked on the hot dip Zn-based alloy coated steel sheet with a positional displacement of 50 mm in a length direction, and thus a lap joint sample was prepared. Table 5 shows MIG brazing conditions. Table 6 shows details of the brazing filler metal.

TABLE 5

| Power source | Direct current system |
|---|---|
| Electric current | 50 to 100 A |
| Voltage | 10 to 30 V |

TABLE 5-continued

| Power source | Direct current system |
|---|---|
| Diameter of brazing filler metal | 1.2 mmφ |
| Target location | End surface of Al alloy (Example)<br>On hot dip Zn-based alloy coated steel sheet (Comparative Example)<br>On Al alloy (Comparative Example) |
| Shielding gas | Ar gas, flow rate: 20 L/min |
| Brazing rate | 0.5 to 1.0 m/min |

TABLE 6

| Type | Composition |
|---|---|
| Pure Al | Purity: 99.0% by mass |
| Al—Si | Si: 0.2 to 15.0% by mass |
| Al—Mn | Mn: 0.03 to 2.0% by mass |
| Al—Mg | Mg: 0.3 to 7.0% by mass |
| Al—Si—Mn—Mg | Si: 0.2 to 15.0% by mass<br>Mn: 0.03 to 2.0% by mass<br>Mg: 0.3 to 7.0% by mass |

The lap joint sample thus prepared was visually observed, and the presence or absence of humping and pits was checked. After the visual observation, X-ray radiography was carried out to check the presence or absence of blowholes. After the X-ray radiography, a sample for tensile test having a width of 30 mm was taken out from a central part of the lap joint sample, and a tensile test was carried out at a tensile speed of 3 mm/min. In the present invention, bonding strength is defined by a maximum load in the tensile test. Bonding strength adequate for the automobile body is 4 kN or more. In the lap joint sample, a sample for observing a cross section was taken out from a part adjacent to the part from which the sample for tensile test was taken out, and cross section observation was carried out with use of a microscope to check a bead width W.

Table 7 shows results of investigating the lap joint sample that was prepared by the fluxless MIG brazing. In regard to the bead appearance in Table 7, a successive bead appearance without humping and pits was evaluated as good, and a case in which humping or pits were generated was evaluated as bad.

TABLE 7

| | Coating layer composition (% by mass) | | | | | | Coating weight per surface (g/m²) | Brazing filler metal Composition (% by mass) | | | | Target location |
|---|---|---|---|---|---|---|---|---|---|---|---|---|
| No. | Al | Mg | Ti | B | Si | Fe | | Si | Mn | Mg | Al | |
| 36 | 1.2 | — | — | — | — | — | 15 | — | — | — | Pure Al | End surface of Al alloy |
| 37 | 4.1 | — | — | — | — | — | 45 | 0.2 | — | — | Bal. | End surface of Al alloy |
| 38 | 21.5 | — | — | — | — | — | 60 | 14.9 | — | — | Bal. | End surface of Al alloy |
| 39 | 1.2 | 0.08 | — | — | — | — | 120 | — | 0.03 | — | Bal. | End surface of Al alloy |
| 40 | 2.1 | 1.9 | — | — | — | — | 150 | — | 2.0 | — | Bal. | End surface of Al alloy |
| 41 | 4.2 | 1.0 | — | — | — | — | 180 | — | — | 0.4 | Bal. | End surface of Al alloy |
| 42 | 21.8 | 0.3 | — | — | — | — | 210 | — | — | 6.9 | Bal. | End surface of Al alloy |
| 43 | 6.0 | 3.0 | — | — | — | — | 245 | 2.1 | 1.0 | — | Bal. | End surface of Al alloy |
| 44 | 5.9 | 3.0 | 0.035 | — | — | — | 90 | 5.6 | — | 7.0 | Bal. | End surface of Al alloy |
| 45 | 6.1 | 2.9 | 0.034 | 0.019 | 0.058 | 0.02 | 90 | 4.7 | 0.9 | 3.9 | Bal. | End surface of Al allay |
| 46 | 11.1 | 3.4 | — | — | — | — | 90 | 0.2 | 0.03 | 0.3 | Bal. | End surface of Al alloy |
| 47 | 11.0 | 3.0 | — | — | 0.054 | 0.01 | 90 | 11.0 | 1.2 | 3.6 | Bal. | End surface of Al alloy |
| 48 | 21.8 | 5.9 | 0.09 | 0.05 | 1.9 | 2.5 | 90 | 15.0 | 2.0 | 7.0 | Bal. | End surface of Al alloy |
| 49 | 0.1 | — | — | — | — | — | 15 | — | — | — | Pure Al | End surface of Al alloy |
| 50 | 1.3 | — | — | — | — | — | 280 | 7.6 | — | — | Bal. | End surface of Al alloy |
| 51 | 21.9 | — | — | — | — | — | 120 | — | 1.1 | — | Bal. | On hot dip Zn-based alloy coated steel sheet 2 mm away from end surface of Al alloy |
| 52 | 6.0 | 3.3 | 0.002 | 0.005 | — | — | 90 | — | — | 7.0 | Bal. | On Al alloy 3 mm away from end surface of Al alloy |
| 53 | 6.3 | 3.0 | 0.002 | 0.002 | — | — | 60 | 0.3 | 0.5 | 0.4 | Bal. | End surface of Al alloy |
| 54 | 6.0 | 2.8 | 0.025 | 0.01 | 0.025 | 0.002 | 90 | 10.5 | 1.1 | 2.6 | Bal. | End surface of Al alloy |
| 55 | 5.9 | 3.0 | 0.1 | 0.05 | 1.8 | 2.4 | 120 | 14.0 | 1.9 | 6.8 | Bal. | End surface of Al alloy |

| No. | Bead appearance | Blowhole | Bead width W (mm) | Tensile test result (kN) | Class |
|---|---|---|---|---|---|
| 36 | Good | None | 2.5 | 4.2 | Example |
| 37 | Good | None | 9.4 | 5.3 | |
| 38 | Good | None | 10.4 | 7.1 | |
| 39 | Good | None | 13.4 | 7.7 | |
| 40 | Good | None | 10.3 | 6.1 | |
| 41 | Good | None | 9.6 | 6.7 | |
| 42 | Good | None | 14.4 | 8.3 | |
| 43 | Good | None | 13.8 | 7.9 | |
| 44 | Good | None | 13.7 | 6.9 | |
| 45 | Good | None | 14.9 | 8.8 | |
| 46 | Good | None | 5.8 | 3.8 | |
| 47 | Good | None | 11.1 | 6.7 | |
| 48 | Good | None | 14.3 | 9.1 | |
| 49 | Good | None | 0.6 | 2.0 | Com. |
| 50 | Bad | Exist | — | — | Example |

TABLE 7-continued

| | | | | |
|---|---|---|---|---|
| 51 | Bad | Exist | — | — |
| 52 | Bad | — | — | — |
| 53 | Good | None | <u>1.6</u> | 3.2 |
| 54 | Good | None | <u>1.1</u> | 2.9 |
| 55 | Good | None | <u>0.8</u> | 1.9 |

In Examples in which fluxless MIG brazing was carried out within the range of the present invention indicated by No. 36 through No. 48 in Table 7, humping and pits were not generated, and good bead appearances were obtained. Moreover, the bonding strength was 4 kN or more, and thus the bonding strength sufficient for an automobile body was obtained.

In contrast, in Comparative Example No. 49 in which an Al concentration of the Zn-based coating layer was smaller than the range of the present invention, the bead width W was smaller, i.e., 0.6 mm, and the bonding strength was insufficient, i.e., 2.0 kN.

In Comparative Example No. 50 in which the coating weight exceeded the range of the present invention and in Comparative Example No. 51 in which the target location was 2 mm away from the end surface of the Al alloy member 3 and was on the hot dip Zn-based alloy coated steel sheet, humping and pits were generated due to influence of Zn vapor, and therefore the bead appearance was notably deteriorated, and blowholes were generated. In Comparative Examples No. 50 and No. 51, the bead appearance was notably deteriorated, and therefore the tensile test was not carried out.

In Comparative Example No. 52 in which the target location was 3 mm away from the upper end of the Al alloy member 3 and was on the Al alloy 3, humping was generated and the bead appearance was notably deteriorated. Therefore, X-ray radiography and the tensile test were not carried out.

In Comparative Examples No. 53 through No. 55, the bead width W was smaller than the range of the present invention, and the bonding strength was insufficient, i.e., 3.2 kN or less.

Example 2-2

Fluxless MIG brazing was carried out with use of a hot dip Zn-based alloy coated steel sheet and each of Al alloys of 1000-series, 3000-series, 5000-series, 6000-series, and 7000-series (see Table 3).

Specifically, a hot dip Zn-based alloy coated steel sheet having a sheet thickness of 1.2 mm, a width of 200 mm, and a length of 100 mm, and an Al alloy member of each series having a sheet thickness of 1.0 mm to 3.0 mm, a width of 200 mm, and a length of 100 mm were prepared. Then, fluxless MIG brazing was carried out with respect to the Al alloy member that was stacked on the hot dip Zn-based alloy coated steel sheet with a positional displacement of 50 mm in a length direction, and thus a lap joint sample was prepared. Fluxless MIG brazing conditions were similar to those in Table 5 above.

Table 8 shows the results. Moreover, as the fluxless wire, brazing filler metals having compositions shown in Table 8 were used.

TABLE 8

| | Coating layer composition (% by mass) | | | | | | Coating weight per surface | Brazing filler metal Composition (mass %) | | | | Type of | Sheet thickness (mm) of |
|---|---|---|---|---|---|---|---|---|---|---|---|---|---|
| No. | Al | Mg | Ti | B | Si | Fe | (g/m²) | Si | Mn | Mg | Al | Al alloy | Al alloy |
| 56 | 6.1 | 2.9 | 0.034 | 0.010 | 0.056 | 0.02 | 90 | 4.7 | 0.9 | 3.9 | Bal. | 1000-series | 1.0 |
| 57 | | | | | | | | | | | | | 2.0 |
| 58 | | | | | | | | | | | | | 3.0 |
| 59 | | | | | | | | | | | | 3000-series | 1.0 |
| 60 | | | | | | | | | | | | | 2.0 |
| 61 | | | | | | | | | | | | | 3.0 |
| 62 | | | | | | | | | | | | 5000-series | 1.0 |
| 63 | | | | | | | | | | | | | 2.0 |
| 64 | | | | | | | | | | | | | 3.0 |
| 65 | | | | | | | | | | | | 6000-series | 1.0 |
| 66 | | | | | | | | | | | | | 2.0 |
| 67 | | | | | | | | | | | | | 3.0 |
| 68 | | | | | | | | | | | | 7000-series | 1.0 |
| 69 | | | | | | | | | | | | | 2.0 |
| 70 | | | | | | | | | | | | | 3.0 |

| No. | Target location | Bead appearance | Blowhole | Bead width W (mm) | Tensile test result (kN) | Class |
|---|---|---|---|---|---|---|
| 56 | Al alloy end surface | Good | None | 1.5 | 3.1 | Example |
| 57 | Al alloy end surface | Good | None | 5.7 | 4.2 | |
| 58 | Al alloy end surface | Good | None | 22.0 | 13.0 | |
| 59 | Al alloy end surface | Good | None | 3.1 | 3.8 | |
| 60 | Al alloy end surface | Good | None | 14.1 | 8.1 | |
| 61 | Al alloy end surface | Good | None | 15.6 | 9.2 | |
| 62 | Al alloy end surface | Good | None | 1.7 | 2.8 | |

TABLE 8-continued

| | | | | | |
|---|---|---|---|---|---|
| 63 | Al alloy end surface | Good | None | 10.4 | 7.5 |
| 64 | Al alloy end surface | Good | None | 18.7 | 10.3 |
| 65 | Al alloy end surface | Good | None | 1.9 | 3.3 |
| 66 | Al alloy end surface | Good | None | 14.9 | 8.8 |
| 67 | Al alloy end surface | Good | None | 19.9 | 12.4 |
| 68 | Al alloy end surface | Good | None | 2.0 | 3.4 |
| 69 | Al alloy end surface | Good | None | 11.0 | 7.8 |
| 70 | Al alloy end surface | Good | None | 21.2 | 12.9 |

In Examples in which fluxless MIG brazing was carried out within the range of the present invention indicated by No. 56 through No. 70 in Table 8, humping and pits were not generated, and good bead appearances were obtained. Moreover, the bonding strength corresponded to the type and the sheet thickness of each of the Al alloys, and thus the bonding strength sufficient for an automobile body was obtained.

Aspects of the present invention can also be expressed as follows:

As above described, the MIG brazing method in accordance with an aspect of the present invention is a method for MIG brazing a bonding target sheet that is stacked on a sheet surface of a hot dip Zn-based alloy coated steel sheet, a coating layer of the hot dip Zn-based alloy coated steel sheet containing 1.0% by mass to 22.0% by mass of Al, and the bonding target sheet being an Al sheet or an Al alloy sheet, the method including: a brazing step of forming a brazed part on the sheet surface for joining the bonding target sheet and the hot dip Zn-based alloy coated steel sheet together, in the brazing step, a target location of the MIG brazing being a region between (i) an intersection of one end of an end surface of the bonding target sheet and the sheet surface and (ii) the other end of the end surface of the bonding target sheet.

According to the MIG brazing method in accordance with an aspect of the present invention, in the brazing step, fluxless MIG brazing can be carried out with use of a fluxless wire as a brazing filler metal.

According to the MIG brazing method in accordance with an aspect of the present invention, it is possible that the brazing filler metal is composed of Al or has a composition that contains Al and one or more selected from the group consisting of Si: 0.2% by mass to 15.0% by mass, Mg: 0.3% by mass to 7.0% by mass, and Mn: 0.03% by mass to 2.0% by mass.

According to the MIG brazing method in accordance with an aspect of the present invention, in the brazing step, the brazed part is preferably formed such that, in a cross section of the brazed part taken along a plane orthogonal to a direction in which the brazed part extends, a bead width of the brazed part on the sheet surface satisfies Formula (1) below:

$$t \leq W \leq 7.5t \quad (1)$$

where
W: bead width (mm) of brazed part
t: sheet thickness (mm) of the bonding target sheet.

According to the MIG brazing method in accordance with an aspect of the present invention, the coating layer of the hot dip Zn-based alloy coated steel sheet can further contain Mg in an amount of 0.05% by mass to 10.0% by mass.

According to the MIG brazing method in accordance with an aspect of the present invention, the coating layer of the hot dip Zn-based alloy coated steel sheet preferably further contains one or two or more selected from the group consisting of Ti: 0.002% by mass to 0.1% by mass, B: 0.001% by mass to 0.05% by mass, Si: 0% by mass to 2.0% by mass, and Fe: 0% by mass to 2.5% by mass.

According to the MIG brazing method in accordance with an aspect of the present invention, a coating weight per surface of the hot dip Zn-based alloy coated steel sheet is preferably 15 g/m² to 250 g/m².

The method for manufacturing a lap joint member in accordance with an aspect of the present invention is a method for manufacturing the lap joint member by brazing a bonding target sheet to a hot dip Zn-based alloy coated steel sheet with the foregoing MIG brazing method.

The lap joint member in accordance with an aspect of the present invention is a lap joint member, in which: a brazed part is formed by stacking and brazing a bonding target sheet onto a sheet surface of a hot dip Zn-based alloy coated steel sheet; a coating layer of the hot dip Zn-based alloy coated steel sheet contains 1.0% by mass to 22.0% by mass of Al; the bonding target sheet is an Al sheet or an Al alloy sheet; and the brazed part is formed such that, in a cross section of the brazed part taken along a plane orthogonal to a direction in which the brazed part extends, a bead width of the brazed part on the sheet surface satisfies Formula (1) below:

$$t \leq W \leq 7.5t \quad (1)$$

where
W: bead width (mm) of brazed part
t: sheet thickness (mm) of the bonding target sheet.

According to the lap joint member in accordance with an aspect of the present invention, the coating layer of the hot dip Zn-based alloy coated steel sheet preferably further contains Mg in an amount of 0.05% by mass to 10.0% by mass.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1: Hot dip Zn-based alloy coated steel sheet
2: Zn-based coating layer
3: Al alloy
4: Bead (brazed part)
5: Fe—Al-based intermetallic compound phase
6: End surface of Al alloy
7: Brazing filler metal wire

The invention claimed is:

1. A method for MIG brazing a bonding target sheet that is stacked on a sheet surface of a hot dip Zn-based alloy coated steel sheet, a coating layer of the hot dip Zn-based alloy coated steel sheet containing 1.0% by mass to 22.0% by mass of Al, and the bonding target sheet being an Al sheet or an Al alloy sheet, the method comprising:

a brazing step of forming a brazed part on the sheet surface for joining the bonding target sheet and the hot dip Zn-based alloy coated steel sheet together, in the brazing step, a target location of the MIG brazing being a region between an intersection of one end of an end surface of the bonding target sheet and the sheet surface and the other end of the end surface of the bonding target sheet, wherein, in the brazing step, the brazed part is formed such that, in a cross section of the brazed part taken along a plane orthogonal to a direction in which the brazed part extends, a bead width of the brazed part on the sheet surface satisfies Formula below:

$t \leq W \leq 7.5\ t$ where

W: bead width (mm) of the brazed part t: sheet thickness (mm) of the bonding target sheet.

2. The method as set forth in claim 1, wherein:

in the brazing step, fluxless MIG brazing is carried out with use of a fluxless wire as a brazing filler metal.

3. The method as set forth in claim 2, wherein:

the brazing filler metal is composed of Al; or the brazing filler metal has a composition that contains Al and one or more selected from the group consisting of Si: 0.2% by mass to 15.0% by mass, Mg: 0.3% by mass to 7.0% by mass, and Mn: 0.03% by mass to 2.0% by mass.

4. The method as set forth in claim 1, wherein:

the coating layer of the hot dip Zn-based alloy coated steel sheet further contains Mg in an amount of 0.05% by mass to 10.0% by mass.

5. The method as set forth in claim 4, wherein:

the coating layer of the hot dip Zn-based alloy coated steel sheet further contains one or two or more selected from the group consisting of Ti: 0.002% by mass to 0.1% by mass, B: 0.001% by mass to 0.05% by mass, Si: 0% by mass to 2.0% by mass, and Fe: 0% by mass to 2.5% by mass.

6. The method as set forth in claim 1, wherein:

a coating weight on the sheet surface of the hot dip Zn-based alloy coated steel sheet is 15 g/m$^2$ to 250 g/m$^2$.

7. The method for manufacturing a lap joint member by brazing a bonding target sheet to a hot dip Zn-based alloy coated steel sheet with a method as set forth in claim 1.

* * * * *